(12) United States Patent
Jenness

(10) Patent No.: US 11,060,608 B2
(45) Date of Patent: Jul. 13, 2021

(54) PISTON RING WITH INLAID DLC COATING AND METHOD OF MANUFACTURING

(71) Applicant: Tenneco Inc., Lake Forest, IL (US)

(72) Inventor: Blair Matthew Jenness, Grosse Pointe Park, MI (US)

(73) Assignee: Tenneco Inc., Lake Forest, IL (US)

( * ) Notice: Subject to any disclaimer, the term of this patent is extended or adjusted under 35 U.S.C. 154(b) by 98 days.

(21) Appl. No.: 16/270,215

(22) Filed: Feb. 7, 2019

(65) Prior Publication Data
US 2020/0256466 A1 Aug. 13, 2020

(51) Int. Cl.
*F16J 9/26* (2006.01)
*C23C 24/08* (2006.01)

(52) U.S. Cl.
CPC .............. *F16J 9/26* (2013.01); *C23C 24/08* (2013.01)

(58) Field of Classification Search
CPC ........ F16J 9/26; F16J 9/00; F16J 9/206; F16J 9/22; C23C 28/00; C23C 28/02; C23C 28/021; C23C 28/023; C23C 28/022; C23C 28/04; C23C 28/046; C23C 16/27; C23C 16/26
USPC ........................................................ 277/444
See application file for complete search history.

(56) References Cited

U.S. PATENT DOCUMENTS

| | | | |
|---|---|---|---|
| 2,855,659 A | 10/1958 | Thomson | |
| 2,881,511 A | 4/1959 | Boegehold | |
| 2,882,190 A | 4/1959 | Thomson et al. | |
| 3,539,192 A * | 11/1970 | Prasse | F16J 9/22 277/444 |
| 4,570,946 A * | 2/1986 | Tsuchiya | C23C 4/02 277/443 |
| 4,724,000 A | 2/1988 | Larson et al. | |
| 4,883,029 A | 11/1989 | Winston | |
| 5,078,837 A * | 1/1992 | Descamp | C25D 13/02 205/181 |
| 5,773,734 A * | 6/1998 | Young | F16J 9/26 419/11 |

(Continued)

FOREIGN PATENT DOCUMENTS

| | | |
|---|---|---|
| CN | 106011771 A | 10/2016 |
| EP | 2672151 A1 | 12/2013 |
| JP | 2003013163 A | 1/2003 |

OTHER PUBLICATIONS

International Search Report, dated Apr. 20, 2020 (PCT/US2020/017147).

*Primary Examiner* — Nathan Cumar
(74) *Attorney, Agent, or Firm* — Robert L. Stearns; Dickinson Wright, PLLC

(57) ABSTRACT

A piston ring providing improved performance during operation, including reduction in blowby gases and improved oil control, is provided. The piston ring includes an upper layer, a lower layer, and a middle layer each formed from a powder metal material. An exposed sharp first corner is present between an upper ring surface and an upper outer diameter surface, and an exposed sharp second corner is present between a lower ring surface and a lower outer diameter surface. The piston ring also comprises a coating including diamond-like carbon (DLC). The DLC coating is inlaid. Thus, the coating is disposed on the middle layer but is spaced from the upper and lower corners, so that the upper and lower corners of the piston ring are exposed.

18 Claims, 2 Drawing Sheets

(56) References Cited

U.S. PATENT DOCUMENTS

| | | | |
|---|---|---|---|
| 6,562,480 B1 * | 5/2003 | Stong | C23C 4/06 29/888.074 |
| 8,017,057 B2 | 9/2011 | Edwards | |
| 2004/0067384 A1 | 4/2004 | Hotger et al. | |
| 2013/0234400 A1 * | 9/2013 | Iijima | F16J 9/12 277/459 |
| 2013/0305918 A1 | 11/2013 | Okazaki et al. | |
| 2017/0108122 A1 | 4/2017 | Smith et al. | |
| 2018/0010689 A1 | 1/2018 | Toth et al. | |
| 2018/0080556 A1 | 3/2018 | Sato et al. | |

\* cited by examiner

PISTON RING WITH INLAID DLC COATING AND METHOD OF MANUFACTURING

BACKGROUND OF THE INVENTION

1. Field of the Invention

The present invention is related generally to piston rings and methods of manufacturing piston rings.

2. Related Art

Internal combustion engine manufacturers are encountering increasing demands to improve engine efficiencies and performance, including, but not limited to, improving fuel economy, improving fuel combustion, reducing oil consumption, increasing the exhaust temperature for subsequent use of the heat, increasing compression loads within the cylinder bores, decreasing weight and making engines more compact. In order to satisfy one or more of these demands, many engine manufacturers have been employing advanced technologies to increase the temperature and pressure loads within the combustion chambers of their engines. Consequently, such pistons must be sealed to their respective cylinder bores with piston rings that are designed to withstand the increasingly extreme environment. Improvements to piston ring performance is desired.

SUMMARY

One aspect of the present invention provides a piston ring for a piston of an internal combustion engine providing for improved performance, specifically a reduction in blowby gases and improved oil control. The piston ring includes an upper layer formed of an upper powder metal material and extending circumferentially around a center axis. The piston ring also includes a lower layer formed of a lower powder metal material extending circumferentially around the center axis. The piston ring further includes a middle layer formed of a middle powder metal material between the upper layer and the lower layer. The middle layer is also formed of a powder metal material. The piston ring further comprises a coating including diamond-like carbon disposed on the middle layer.

Another aspect of the invention provides a method of manufacturing a piston ring. The method comprises providing an upper layer formed of an upper powder metal material extending circumferentially around a center axis, and disposing a middle layer formed of a middle powder metal material extending circumferentially around the center axis along the upper layer. The method also includes disposing a lower layer formed of a lower powder metal material extending circumferentially around the center axis along the middle layer. The method further includes disposing a coating including diamond-like carbon on the middle layer.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF EXEMPLARY EMBODIMENTS

Figure 1:
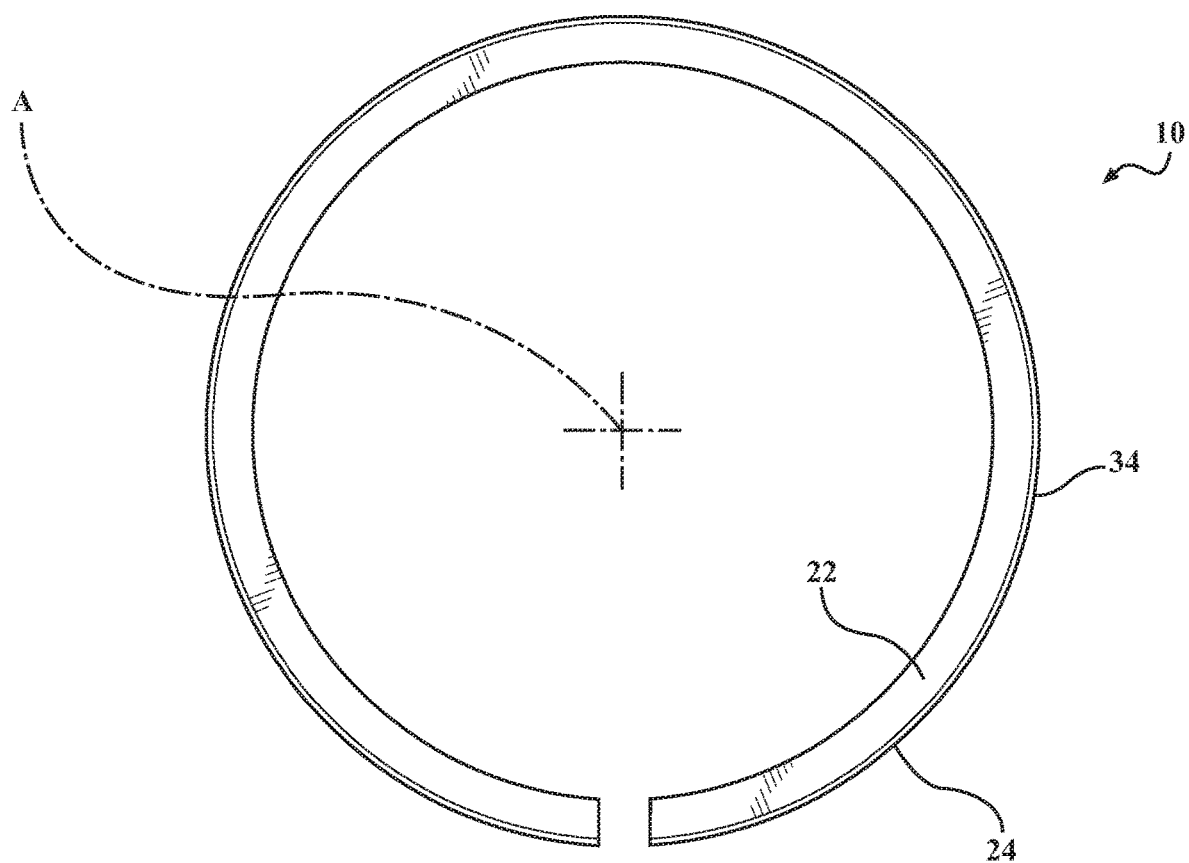
FIG. 1 is a top view of a piston ring according to an example embodiment.
Figure 2:
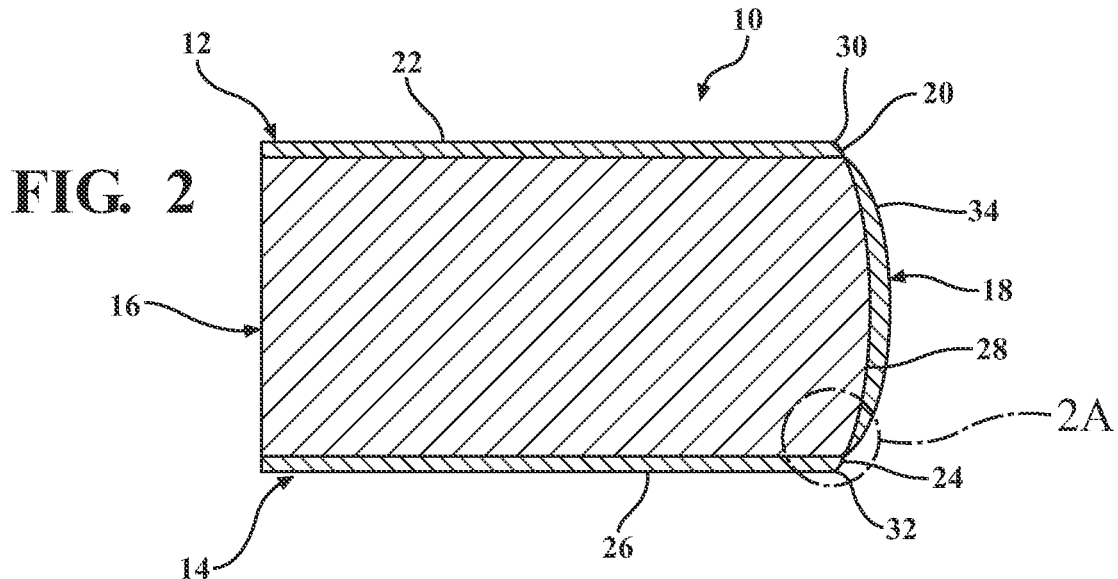
FIG. 2 is a cross-sectional view of the piston ring according to a first example embodiment.
Figure 3:
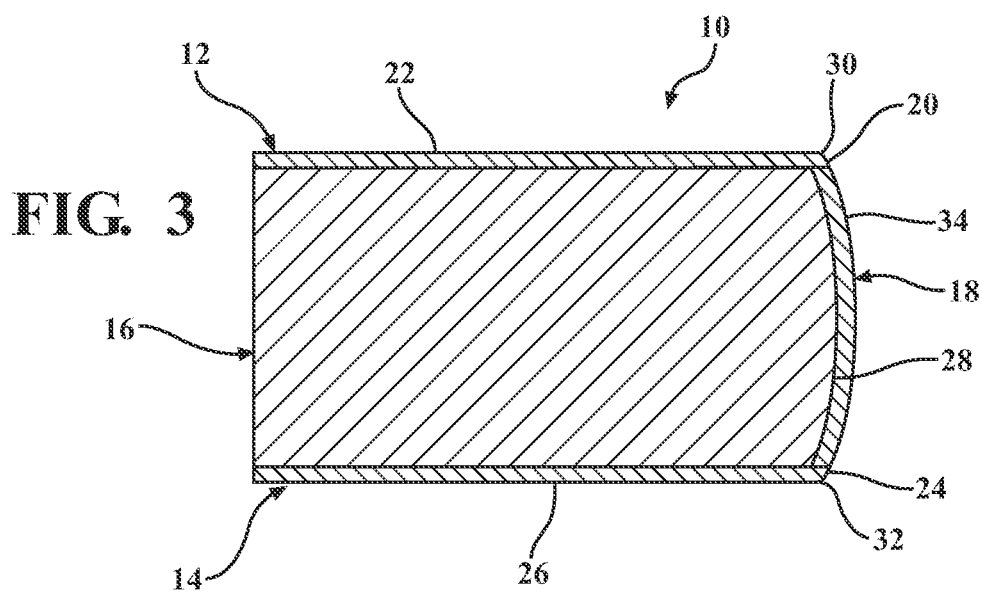
FIG. 3 is a cross-sectional view of the piston ring according to a second example embodiment.

As shown in FIGS. 1-3, the invention provides a piston ring 10 for an internal combustion engine which is capable of providing improved performance during operation, including reduction in blowby gases and improved oil control. The piston ring 10 includes an upper layer 12, a lower layer 14, and a middle layer 16 each formed from a powder metal material. The piston ring 10 also comprises a coating 18 including diamond-like carbon (DLC).

As shown in FIG. 1, an upper ring surface 22 of the upper layer 12 of the piston ring 10 extends circumferentially around a center axis A between opposite ends. The upper layer 12 presents an upper outer diameter surface 20. The upper layer 12 is formed of an upper powder metal material, for example a steel powder. A first corner 30 is formed between the upper outer diameter surface 20 and the upper ring surface 22, and the first corner 30 is sharp.

The lower layer 14 of the piston ring 10 extends circumferentially around the center axis A between opposite ends. The lower layer 14 presents a lower outer diameter surface 24. The lower layer 14 is formed of a lower power metal material, for example steel powder. The lower layer 14 presents a lower ring surface 26 opposite the upper ring surface 22. A second corner 32 is formed between the lower outer diameter surface 24 and the lower ring surface 26, and the second corner 32 is also sharp. The sharp corners 30, 32 remain exposed and free of the coating 18 and thus help to reduce blowby gases during operation.

The middle layer 16 also extends circumferentially around the center axis A between opposite ends, and the middle layer 16 is disposed between the upper layer 12 and the lower layer 14. The middle layer 16 presents a middle outer diameter surface 28 which can be flush with or disposed radially inwardly of the upper outer diameter surface 20 and the lower outer diameter surface 24. In the embodiment of FIG. 2, the middle outer diameter surface 28 is flush with the upper outer diameter surface 20 and the lower outer diameter surface 24. In the embodiment of FIG. 3, the middle outer diameter surface 28 is disposed radially inwardly of the upper outer diameter surface 20 and the lower outer diameter surface 24. The middle layer 16 is formed of a middle powder metal material, for example steel. According to one embodiment, the middle layer 16 has a higher resistance to oxidation than the upper powder metal material and the lower powder metal material.

The coating 18 includes diamond-like carbon and is disposed on the middle outer diameter surface 28. The coating 18 presents a coating outer diameter surface 34 which is flush with the upper outer diameter surface 20 and the lower outer diameter surface 24 or disposed radially outwardly of the upper outer diameter surface 20 and the lower outer diameter surface 24. In the embodiment of FIG. 2, the coating outer diameter surface 34 is radially outwardly of upper outer diameter surface 20 and the lower outer diameter surface 24. In the embodiment of FIG. 3, the coating outer diameter surface 34 is flush with the upper outer diameter surface 20 and the lower outer diameter surface 24. In both embodiments, the coating 18 covers the middle layer 16.

The coating 18 is spaced from the upper ring surface 22 and the first corner 30 by the upper outer diameter 20 and/or spaced from the lower ring surface 26 and the second corner 32 by the lower outer diameter surface 24. Preferably, the coating 18 is spaced from the upper ring surface 22 and the first corner 30 and also spaced from the lower ring surface 26 and the second corner 32. Thus, the coating 18 can be referred to as "inlaid." Preferably, the coating 18 is disposed only on the middle outer diameter surface 28 and not on the upper and lower outer diameter surfaces 20, 24. However, a small amount of the coating 18 could be left on the upper and lower outer diameter surfaces 20, 24 but only in areas spaced from the first and second corners 30, 32, so that the corners 30, 32 are exposed and capable of helping to reduce blowby gases. Since the coating 18 is inlaid, during operation it has less exposure to hot combustion gases which can damage the coating 18. The coating outer diameter surface 34, the upper outer diameter surface 20, and the lower outer diameter surface 24 present an outermost surface of the piston ring 10.

According to one embodiment, the lower powder metal material of the lower layer 14 and the upper powder metal material of the upper layer 12 are the same. For example, both can be formed of steel. According to another embodiment, the lower powder metal material has a higher wear resistance than the upper powder metal material. The lower powder metal material could include chrome, or a layer of chrome 36 could be disposed on the lower ring surface 26 of the lower layer 14.

Another aspect of the invention provides a method of manufacturing the piston ring 10. The method includes providing the upper layer 12 extending circumferentially around the center axis A, disposing the middle layer 16 along the upper layer 12, and disposing the lower layer 14 along the middle layer 16. The layers 12, 14, 16 can be disposed along each other in any order, for example, the upper layer 12 could be disposed along the middle layer 14 before the middle layer 14 is disposed along the upper layer 12.

The method further includes disposing the coating 18 including diamond-like carbon on the middle outer diameter surface 28 of the middle layer 16. According to one embodiment, the method includes disposing the coating 18 on all of the outer diameter surfaces 20, 28, 24, including the upper outer diameter surface 20 and the lower outer diameter surface 24, and then removing the coating from the upper outer diameter surface 20 and the lower outer diameter surface 24 so that the coating 18 only remains on the middle outer diameter surface 28 and thus is "inlaid."

According to one embodiment, the method can include heating the layers 12, 14, 16 until the upper outer diameter surface 20 and the lower outer diameter surface 24 oxidize before applying the coating 18 and before removing the coating 18. The oxidation may make it easier to remove the coating 18 from the upper outer diameter surface 20 and the lower outer diameter surface 24. The method can also include removing a portion of the coating 18 from the middle outer diameter surface 28, for example at the same time as the coating 18 is removed from the upper outer diameter surface 20 and the lower outer diameter surface 24, until the coating outer diameter surface 34 is flush with the upper outer diameter surface 20 and the lower outer diameter surface 24. For example, the coating 18 can be removed by polishing. According to another embodiment, the coating 18 is only applied to the middle outer diameter surface 24 and not the upper outer diameter surface 20 and the lower outer diameter surface 24. The coating 18 is not present at the sharp upper and lower corners 30, 32 so that the sharp upper and lower corners 30, 32 are exposed able to reduce blowby gases.

Figure 2A:
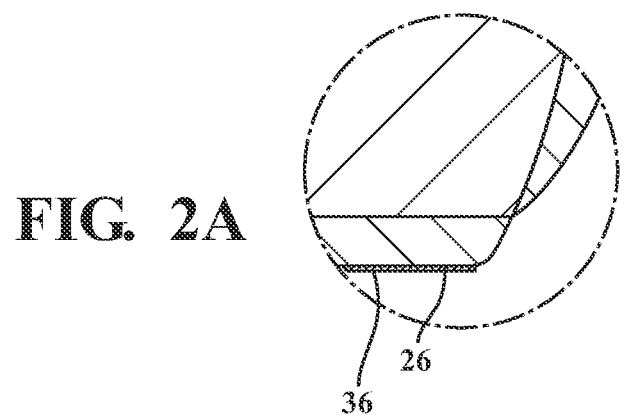
FIG. 2A is an enlarged version of a portion of FIG. 2.

According to one embodiment, the lower powder metal material is formed of a material having a higher wear resistance than the upper powder metal material. The lower powder metal material could include chrome. Alternatively, the method could include disposing the chrome layer 36 on the lower ring surface 26 to improve wear resistance. According to one embodiment, chrome could be galvanically applied to the lower ring surface 26 of the lower layer 14. The chrome could form the thin chrome layer 36 shown in FIG. 2A, for example having a thickness of 5 microns.

The piston ring 10 described herein can provide several advantages, including reduce the amount of blowby gases and improve oil control. In addition, the powder metal materials forming the layers 12, 14, 16 allows for a convenient manufacturing process. For example, when the upper and lower metal materials easily oxidize while the middle powder metal material does not, the coating 18 can be applied to all of the outer diameter surfaces 20, 24, 28 and then can be easily removed from the upper and lower outer diameter surfaces 20, 24 during a rough polishing operation, leaving the coating 18 on the middle outer diameter surface 28. In addition, the lower powder metal material could be a material that has a much higher wear resistance than the other metal powder materials.

Obviously, many modifications and variations of the present invention are possible in light of the above teachings and may be practiced otherwise than as specifically described while within the scope of the claims. It is contemplated that all features described and of all embodiments can be combined with each other, so long as such combinations would not contradict one another.

What is claimed is:

1. A piston ring, comprising:
an upper layer extending circumferentially around a center axis, said upper layer formed of an upper powder metal material, said upper layer presents an upper ring surface, said upper layer presents an upper outer diameter surface, and a first corner is present between said upper ring surface and said upper outer diameter surface;
a lower layer extending circumferentially around said center axis, said lower layer formed of a lower powder metal material, said lower layer presents a lower ring surface opposite said upper ring surface, said lower layer presents a lower outer diameter surface, a second corner is present between said lower outer diameter surface and said lower ring surface;
a middle layer extending circumferentially around said center axis and disposed between said upper layer and said lower layer, said middle layer being formed of a middle powder metal material, said middle layer presenting a middle outer diameter surface between said upper outer diameter surface and said lower outer diameter surface;
a coating including diamond-like carbon disposed on an entirety of said middle outer diameter surface of said middle layer, said coating being spaced from at least one of said corners such that said at least one corner is exposed, and wherein a coating outer diameter surface, said upper outer diameter surface, said upper ring surface, said lower ring surface, and said lower outer diameter surface are outermost surfaces on three sides of said piston ring.

2. A piston ring according to claim 1, wherein said middle outer diameter surface is flush with said upper outer diameter surface and said lower outer diameter surface, and said coating outer diameter surface is disposed radially outward of said upper outer diameter surface and said lower outer diameter surface.

3. A piston ring according to claim 1, wherein said middle outer diameter surface is disposed radially inwardly of said upper outer diameter surface and said lower outer diameter surface, and said coating outer diameter surface is flush with said upper outer diameter surface and said lower outer diameter surface.

4. A piston ring according to claim 1, wherein said coating is spaced from at least one of said upper and lower ring surfaces.

5. A piston ring according to claim 1, wherein said coating is spaced from said first corner and spaced from said second corner.

6. A piston ring according to claim 1, wherein at least one of said upper powder metal material and said lower metal material is steel.

7. A piston ring according to claim 1, wherein said middle powder metal material has a resistance to oxidation that is higher than the resistance to oxidation of said upper powder metal material said lower powder metal material.

8. A piston ring according to claim 1, wherein said lower metal material has a higher wear resistance than said upper powder metal material.

9. A piston ring according to claim 1, wherein said lower powder metal material includes chrome.

10. A piston ring according to claim 1, wherein a layer of chrome is disposed on said lower layer.

11. A piston ring according to claim 1, wherein said coating consists essentially of diamond-like carbon.

12. A method of manufacturing a piston ring, comprising the steps of:
provided an upper layer formed of an upper powder metal material extending circumferentially around a center axis, the upper layer presenting an upper ring surface, the upper layer presenting an upper outer diameter surface, and a first corner is present between the upper ring surface and the upper outer diameter surface;
disposing a middle layer formed of a middle powder metal material extending circumferentially around the center axis along the upper layer, the middle layer presenting a middle outer diameter surface;
disposing a lower layer formed of a lower powder metal material extending circumferentially around the center axis along the middle layer, the lower layer presenting a lower ring surface opposite the upper ring surface, the lower layer presenting a lower outer diameter surface, and a second corner is present between the lower outer diameter surface and the lower ring surface; and
disposing a coating including diamond-like carbon on an entirety of the middle outer diameter surface of the middle layer, the coating being spaced from at least one of the corners such that the at least one corner is exposed, and wherein a coating outer diameter surface, the upper outer diameter surface, the upper ring surface, the lower ring surface, and the lower outer diameter surface are outermost surfaces on three sides of the piston ring.

13. A method according to claim 12 including disposing the coating on the upper outer diameter surface and the lower outer diameter surface, and removing the coating from the upper outer diameter surface and the lower outer diameter surface.

14. A method according to claim 13 including heating the layers until the upper outer diameter surface and the lower outer diameter surface oxidize before disposing the coating on the outer diameter surfaces and before removing the coating from the upper outer diameter surface and the lower outer diameter surface.

15. A method according to claim 12 including removing a portion of the coating until the coating outer diameter surface is flush with the upper outer diameter surface and the lower outer diameter surface.

16. A method according to claim 12, wherein the coating is spaced from the first and second corners.

17. A method according to claim 12, wherein at least one of the upper powder metal material and the lower powder metal material is steel, and the middle powder metal material has a higher resistance to oxidation than the upper powder metal material and the lower powder metal material.

18. A method according to claim 12, wherein the lower powder metal material includes chrome and/or a layer of chrome is disposed on the lower layer.

* * * * *